United States Patent Office 2,975,184
Patented Mar. 14, 1961

2,975,184

YOHIMBONE DERIVATIVES AND PROCESS THEREFOR

John Shavel, Jr., Mendham, N.J., assignor to Warner-Lambert Pharmaceutical Company, Morris Plains, N.J., a corporation of Delaware No Drawing. Filed Mar. 31, 1959, Ser. No. 803,091

7 Claims. (Cl. 260—289)

This invention relates to new and novel derivatives of yohimbone having desirable therapeutic properties, and to methods for their preparation.

The compounds of this invention have the formula:

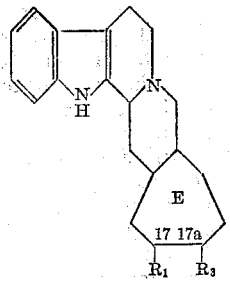

and

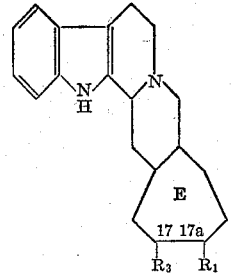

where $R_1$ is hydrogen, keto, hydroxyl or $-OR_2$, $R_2$ being lower alkyl sulfonyl, lower alkyl substituted benzene sulfonyl, the acyl radical of a lower alkyl carboxylic acid, benzoyl, or benzoyl substituted with 1 to 3 lower alkyl, lower alkoxy or halo groups; and $R_3$ is hydrogen, lower alkyl, phenyl substituted lower alkyl, cycloalkyl and lower alkyl substituted cycloalkyl with 5 to 6 carbon atoms in the ring, phenyl, 3,4-methylenedioxyphenyl or phenyl substituted with 1 to 3 lower alkyl, lower alkoxy or halo groups.

As used throughout the specification and in the claims, the terms "lower alkyl" and "lower alkoxy" refer to branched and straight chain aliphatic groups having not more than about 6 carbon atoms.

Pharmaceutically acceptable non-toxic organic and inorganic acid addition salts and quaternary ammonium salts of the above described compounds are also included within the scope of the new and novel yohimbone derivatives of this invention.

The new compounds of this invention differ from yohimbane in that the E ring of the yohimbane structure to which the keto group is attached at the 17 position in yohimbone is expanded from a 6 to a 7 carbon atom cycloalkyl ring. The compounds of this invention for convenience may be referred to as E-homoyohimbanes substituted in the expanded E ring in the 17 and 17a positions. The compounds of this invention are position isomers which can be separated into the individual compounds from mixtures thereof, but are not amenable to conversion from one isomeric form to the other. In the above structural formula where $R_1$ is a keto group and $R_3$ is phenyl, for example, there are two position isomers which exist, namely, 17-phenyl-17a-E-homoyohimbone and 17a-phenyl-17-E-homoyohimbone. By the more formalized structural nomenclature for these compounds, the compound herein referred to as 17-phenyl-17a-E-homoyohimbone may also be called 2,3,4,5,5a,6,8,9,14,14b,15,15a - dodecahydro - 2 - phenyl - 1H - cyclohept [g] indolo [2,3-a]-quinolizin 3-one.

Throughout the specification and claims the simplified nomenclature identifying the compounds of this invention as substituted E-homoyohimbanes will be employed.

The compounds of this invention have useful pharmacological properties. They have valuable hypotensive and adrenolytic activity. For therapeutic use, the compounds of this invention may be formulated with a conventional pharmaceutical carrier to form tablets, capsules, elixirs, solutions or suspensions for injection, suppositories and the like.

In the preparation of the new and novel compounds of this invention the initial step is the expansion of the E ring of yohimbone from a 6 to a 7 carbon atom cycloalkyl ring. It has been found that the reaction of yohimbone with diazomethane or with a mono-substituted diazomethane acts to form a new ketone having the desired 7 membered E ring. This reaction is represented as follows:

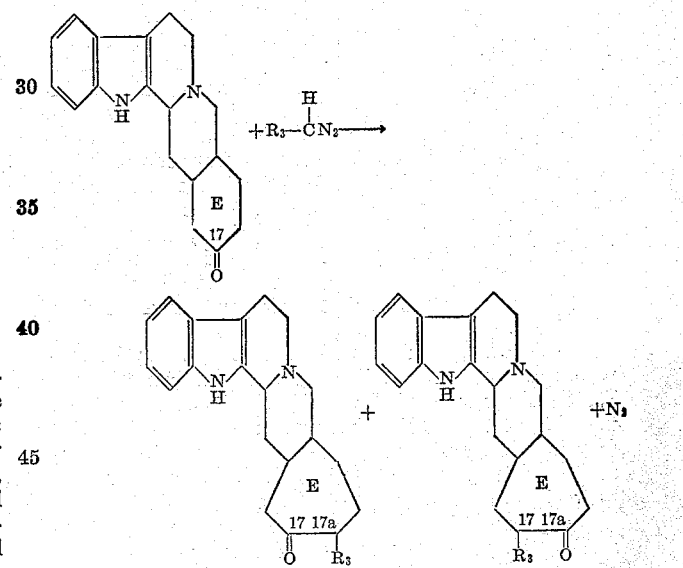

where $R_3$ is hydrogen, lower alkyl, phenyl substituted lower alkyl, cycloalkyl and lower alkyl substituted cycloalkyl with 5 to 6 carbon atoms in the ring, phenyl, 3,4-methylenedioxyphenyl and phenyl substituted with 1 to 3 lower alkyl, lower alkoxy or halo groups. Typical examples of suitable diazomethanes are diazomethane itself, $CH_2N_2$, and the substituted diazomethanes wherein $R_3$ is methyl, ethyl, n-propyl, isopropyl, n-butyl, tert.-butyl, n-amyl, n-hexyl, 3-methylpentyl, 2-phenylethyl, 3-phenylpropyl, phenylmethyl, cyclopentyl, cyclohexyl, methylcyclopentyl, ethylcyclohexyl, phenyl, 3,4-methylenedioxyphenyl, o-, m-, or p-methylphenyl, o-, m-, or p-methoxyphenyl, o-, m-, or p-chlorophenyl, 3,5-dimethylphenyl, 3,5-dichlorophenyl, 3,4,5-trimethoxyphenyl and the like. In the reaction of yohimbone with the $R_3$ monosubstituted diazomethanes described, the E ring of yohimbone is expanded from a 6 to a 7 carbon atom cycloalkyl ring and the radical represented by $R_3$ in the above formula is attached to the carbon atom of the expanded ring adjacent to that to which the keto group is attached.

Yohimbone may be prepared by methods well-known in the prior art, such as that disclosed by B. Witkop in Ann. 554, p. 83 (1943). The reaction of yohimbone with an $R_3$ mono-substituted diazomethane may be carried out in either of two ways. In the ex situ method a suspension of yohimbone in an organic solvent such as methanol, chloroform, ethanol, ether and the like is mixed with an $R_3$ mono-substituted diazomethane. In the in situ method a suspension of yohimbone is treated with a material which is capable of decomposing or otherwise reacting to liberate the desired $R_3$ mono-substituted diazomethane. For example, diazomethane ($R_3$ being hydrogen) may be formed in situ by the decomposition, in basic media, of such materials as nitrosomethyl urea, nitrosomethylurethane and the like. In either the in situ or ex situ method, the reaction mixture is stirred for a period of from about 12 hours to several days, while being maintained at a convenient reaction temperature, for example, between 0° C. and room temperature. At the end of the reaction the organic solvent is removed by evaporation and the product may be purified to any desired degree by repeated re-crystallizations from suitable organic solvents.

The substituted E-homoyohimbone product obtained as the reaction product is a mixture of two position isomers. In one the $R_3$ substituent is at the 17a-position of the E ring with the keto group being at the 17-position, while in the other the $R_3$ substituent is at the 17-position and the keto group is at the 17a-position. The mixture of position isomers obtained is of use therapeutically in this form or it can be further reacted to form additional useful therapeutic agents by the techniques to be described hereinafter. Alternately, the mixture of position isomers which is obtained may be separated into the individual isomers which may then be used therapeutically, or as intermediates in the synthesis of additional derivatives. It has been found that the position isomers may be readily separated by fractional crystallization from such solvents as methylene dichloride, ethylene dichloride, chloroform, tetrahydrofuran and the like. The position isomers may also be separated chromatographically, for example, by passing the mixed isomers dissolved in an organic solvent through a column of activated alumina and thereafter washing the column with successive portions of solvent.

The E-homoyohimbones of this invention may be converted to the corresponding E-homoyohimbanes by the Wolf-Kishner reduction whereby the keto group is removed. In the Wolf-Kishner reduction a solution of a substituted E-homoyohimbone dissolved in a solvent such as diethylene glycol is refluxed with anhydrous hydrazine, water is added to the reaction mixture to form a precipitate which may then be purified by re-crystallization from organic solvents. The E-homoyohimbane obtained will then be monosubstituted with the substituent $R_3$ which remains depending upon the particular monosubstituted diazomethane reacted with yohimbone. It has been found that the keto group can be removed from the substituted E-homoyohimbone without adversely influencing the 7 membered E ring or the particular $R_3$ substituent.

The E-homoyohimbones of this invention, either as a mixture of position isomers or the individual position isomers, may be reduced to form the corresponding E-homoyohimbols by the following reaction:

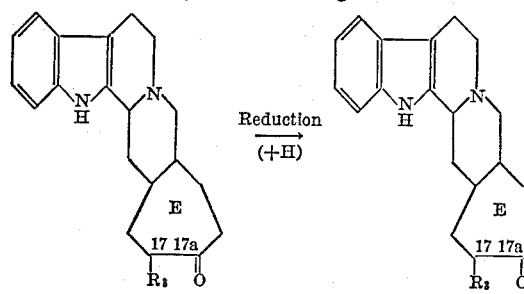

The reduction of the ketone to the corresponding alcohol is brought about with such reducing agents as the alkali metal borohydrides, alkali metal aluminum hydrides, metal alkoxides such as sodium and potassium ethoxide and isopropoxide, the alkali metal tri-t-butoxy aluminum hydrides, or by catalytic hydrogenation with hydrogen in the presence of a platinum or palladium hydrogenation catalyst, and the like. The alkali metal borohydrides such as sodium and potassium borohydride, and lithium tri-t-butoxy aluminum hydride are preferred reducing agents. The reduction of the E-homoyohimbones to the corresponding E-homoyohimbols with these preferred reducing agents results in the formation of products which have higher tranquilizing activity as determined by tests in Rhesus monkeys.

The reduction is carried out in the liquid phase employing a suitable organic solvent to form solution of the E-homoyohimbone to be reduced together with the reducing agent. The choice of solvent is not critical although a solvent which is capable of extensively decomposing the reducing agent should be avoided. The temperature may be varied, for example, between room temperature and the boiling point of the organic solvent used. At the conclusion of the reaction the E-homoyohimbol is recovered from the solution by conventional means and may be purified to the desired degree by repeated crystallizations from organic solvents.

It is believed that the greater activity observed in E-homoyohimbols formed by reduction with the preferred reducing agents, is due to selective formation of more active optical isomers. For example, in the production of 17-phenyl-17a-E-homoyohimbol,

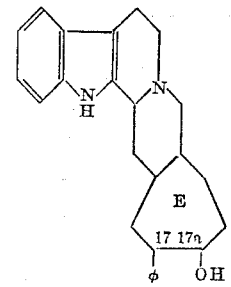

new asymmetric centers are created at both the 17 and 17a positions. Thus, 4 optical isomers are possible. The existence of various optical isomers in E-homoyohimbols has been established from the observation that the reduction products of a given E-homoyohimbone have different degrees of optical rotation depending upon the particular reducing agent used.

Where a mixture of the two position isomers of an E-homoyohimbone is reduced, the alcohol formed will consist of a mixture of two position isomers. Because of the fact that new asymmetric centers are formed at the 17 and 17a positions each one of the position isomers may comprise 4 optical isomers.

The E-homoyohimbols obtained in accordance with the present invention may be used in the form of the alcohols or the latter may be converted into ester derivatives with an esterifying agent by the following reaction:

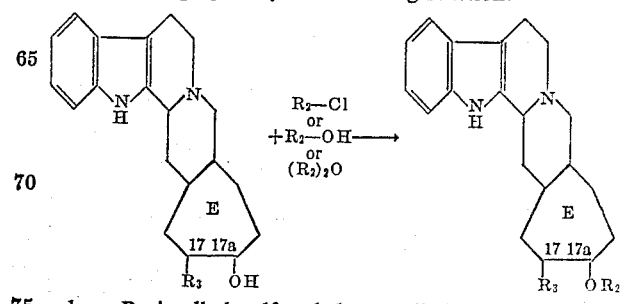

where $R_2$ is alkyl sulfonyl, lower alkyl substituted benzene sulfonyl, the acyl radical of a lower alkyl carboxylic acid, benzoyl or benzoyl substituted with 1 to 3 radicals selected from the group consisting of lower alkyl, halo and lower alkoxy. Esterification of the E-homoyohimbols may be carried out in accordance with the conventional methods of producing esters from alcohols with the E-homoyohimbol being reacted with an acid, an acid anhydride or an acylhalide. Typical esters which may be formed from E-homoyohimbols in accordance with this invention include the formate, acetate, propionate, butyrate, benzoate, p-methylbenzoate, p-chlorobenzoate, 3,4,5-trimethoxybenzoate, methane sulfonate, p-toluene sulfonate, and the like.

Where the E-homoyohimbol has been obtained by reduction of the mixed position isomers, the corresponding ester derivatives also exist as a mixture of position isomers. Since the carbon atoms at both the 17 and 17a positions are asymmetric carbon atoms each position isomer of the ester may exist as 4 possible optical isomers.

The new and novel E-homoyohimbanes, E-homoyohimbones, E-homoyohimbols and E-homoyohimbol esters of this invention are useful as the free base or they may be converted into non-toxic acid addition salts or into quaternary ammonium salts. Exemplary of non-toxic acid addition salts are those formed with maleic, fumaric, benzoic, ascorbic, succinic, bismethylenesalicylic, methylsulfonic, ethanedisulfonic, acetic, propionic, tartaric, salicylic, citric, gluconic, lactic, malic, mandelic, cinnamic, citraconic, stearic, palmitic, itaconic, glycolic, benzenesulfonic, hydrochloric, hydrobromic, sulfuric, sulfamic, phosphoric and nitric acids. The acid addition salts may be prepared in the conventional manner, for example, by treating a solution or suspension of the free base in an organic solvent with the desired acid, and then recovering the salt which forms by crystalliztaion techniques. The quaternary salts are prepared by heating a suspension of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

The following examples are included further to illustrate the present invention:

Example 1

A quantity of 20 grams of yohimbone prepared by the method of Witkop, Ann. 554, 83 (1943), was suspended in 200 ml. methanol containing 1.3 grams potassium carbonate. To the mixture was added drop-wise over a period of 20 minutes 21 grams N-nitrosobenzylurethane. The solution was allowed to react for 16 hours. Two 0.1 mol portions of N-nitrosobenzylurethane were added and the mixture was allowed to react an additional 8 hours. The solution was then heated to evaporate methanol. The first crop of product weighing 3.5 grams had a melting point of 235–248° C. and an $[\alpha]_D^{25}$ of —16° in chloroform (optical rotation). The second crop weighing 12.5 grams had a similar melting point and an $[\alpha]_D^{25}$ of —29° in chloroform.

The foregoing example illustrates the preparation of a mixture of the two position isomers of 17,17a-phenyl-E-homoyohimbone by the reaction of yohimbone with phenyldiazomethane formed in situ by the decomposition of N-nitrosobenzylurethane.

Example 2

To a suspension of 100 grams of yohimbone in 2 liters methanol was added a solution of 118 grams phenyldiazomethane in 220 ml. petroleum ether (B.P. 85 to 100° C.). The mixture was stirred continuously for 48 hours. After concentration by evaporation, 87 grams of product were obtained with a melting point of 234–242° C. and an $[\alpha]_D^{25}$ of —16° in chloroform.

The foregoing example illustrates the preparation of the two position isomers of 17,17a-phenyl-E-homoyohimbone ex situ by the reaction of yohimbone with phenyldiazomethane.

The following Examples 3 to 5 illustrates the separation of the mixture of the position isomers in the product prepared by the method of Example 2 by taking advantage of the differential solubilities of the position isomers in various solvents.

Example 3

A quantity of 21 grams of the product of Example 2 was stirred with 85 ml. methylene dichloride for 20 hours. The insoluble material was filtered to give 9.35 grams of product with an $[\alpha]_D^{25}$ of +40° in chloroform. The filtrate was evaporated to dryness and the residue recrystallized from ethylene dichloride to give 7.68 grams of product with an $[\alpha]_D^{25}$ of —74° in chloroform.

Example 4

A quantity of 28 grams of the product of Example 2 was refluxed with 250 ml. chloroform for 1 hour and the solution cooled to 10° C. 7.28 grams of crystals with an $[\alpha]_D^{25}$ of +50° in chloroform were obtained. Concentration of the filtrate to 80 ml. and further cooling yielded 10.8 grams crystals, $[\alpha]_D^{25}$ of +31° in chloroform. Evaporation of the mother liquir yielded 4.28 grams of crystals with an $[\alpha]_D^{25}$ of —66° in chloroform.

Example 5

A quantity of 43 grams of product obtained by the procedure of Example 2 with an $[\alpha]_D^{25}$ of —14° in chloroform was stirred with 210 ml. of tetrahydrofuran for 4 hours. 21.5 grams of crystals, $[\alpha]_D^{25}$ of +51° in chloroform was obtained. The filtrate was concentrated to 100 ml., diluted with 50 ml. ether and the crystals separated by filtration. 16.1 grams, $[\alpha]_D^{25}$ of —50° in chloroform, were obtained.

The following Example 6 illustrates the separation of the position isomers obtained by the method of Example 2 by chromatographic techniques and the purification of each isomer by crystallization to form the pure compounds 17-phenyl-17a-E-homoyohimbone and 17a-phenyl-17-E-homoyohimbone.

Example 6

9.16 grams of a mixture of position isomers obtained by the method of Example 2 with an $[\alpha]_D^{25}$ in chloroform of —18° was dissolved in 150 ml. chloroform and the solution passed over a column of 350 grams of activated alumina. Fractions of 50 ml. were collected and additional chloroform continuously added. Material showing a positive rotation is obtained in the first 12 fractions, and material with a negative rotation in the second 12 fractions. The first 12 fractions were combined and recrystallized from chloroform-ethanol solution. Crystals having a melting point of 288–294° C. and an $[\alpha]_D^{25}$ of +54° in chloroform were obtained. Recrystallization of the material from the second 12 fractions yields crystals having a melting point of 246–253° C. and an $[\alpha]_D^{25}$ of —83° in chloroform.

The crystalline material obtained in Example 6 showing a positive rotation in chloroform was analyzed and found to contain 81.19 percent carbon, 7.30 percent hydrogen, and 7.31 percent nitrogen. The calculated analysis for 17,17a-phenyl-E-homoyohimbone ($C_{26}H_{28}N_2O$) is 81.21 percent carbon, 7.34 percent hydrogen, and 7.29 percent nitrogen. The infrared absorption spectrum run in a KBr pellet shows the following characteristic bands in reciprocal centimeters; an >NH band at 3360, a carbonyl band at 1688, a di-substituted benzene band (indole) at 746, and mono-substituted benzene band at 700. The ultraviolet spectrum in 95 percent ethanol exhibits a shoulder at 289 m$\mu$ ($\epsilon$=6600), maxima at 282 m$\mu$ ($\epsilon$=7900) and 225 m$\mu$ ($\epsilon$=39,500), and a minima at 247 m$\mu$ ($\epsilon$=2500). The ultraviolet spectrum is of the yohimbane type.

The crystalline material obtained in Example 6 showing a negative rotation in chloroform was analysed and found to contain 80.87 percent carbon, 7.19 percent hydrogen and 7.18 percent nitrogen; calculated for $C_{26}H_{28}N_2O$ is 81.21 percent carbon, 7.34 percent hydrogen and 7.29 percent nitrogen. The infrared spectrum of this compound run in a KBr pellet is the same as that of the compound showing a positive rotation in chloroform as described above. The ultraviolet spectrum run in 95 percent ethanol is of the yohimbane type and exhibits a shoulder at 290 m$\mu$ ($\epsilon$=7500), maxima at 282 m$\mu$ ($\epsilon$=8200) and 225 m$\mu$ ($\epsilon$=43,900), and a minima at 246.5 m$\mu$ ($\epsilon$=2500).

The characteristic ultraviolet spectrum obtained indicates that the reaction of yohimbone with phenyldiazomethane does not destroy the five ring structure of the yohimbane type.

The existance of characteristic >NH and carbonyl infrared absorption bands establishes that the phenyl group of phenyldiazomethane is not added directly to the >NH or to the carbonyl groups of yohimbone.

The following example illustrates the preparation of the 2,4-dinitrophenylhydrazone sulfate derivative of the position isomer at 17,17a-phenyl-E-homoyohimbone with a negative rotation in chloroform. The preparation of this derivative is a characteristic of ketones, and furnishes additional evidence of the presence of a carbonyl group in the product prepared as described in Example 2.

*Example 7*

To 0.3 g. of 17,17a-phenyl-E-homoyohimbone, M.P. 246–253° C., $[\alpha]_D^{25}$ of −83° in chloroform obtained as described in Example 6 in 30 ml. ethanol was added a solution of 0.25 g. dinitrophenylhydrazine in 25 ml. ethanol containing 2 ml. conc. sulfuric acid. After standing for five hours at 25° C. the yellow precipitate that was formed was filtered off and washed with 20 ml. of ethanol. The product recrystallized from glacial acetic acid has a melting point of 244–5° C.

*Analysis.*—Calc. $C_{32}H_{34}N_6O_4 \cdot 1\frac{1}{2}H_2SO_4$ C: 53.85; H: 5.23; N: 11.75. Found C: 53.93; H: 5.57; N: 11.63.

The separation described in Example 6 results in the preparation of two pure compounds showing different optical rotations and different melting points, but having the same chemical analysis and exhiting substantially the same infrared and ultraviolet spectra. The fact that these materials have different melting points indicates that they are position isomers rather than optical isomers. This is further established by the following example which illustrates the base-catalysed epimerization of each compound.

*Example 8*

To 0.3 g. of 17,17a-phenyl-E-homoyohimbone, M.P. 288–294° C., $[\alpha]_D^{25}$ of +54° in chloroform, obtained as described in Example 6, in 150 ml. of ethanol and 10 ml. methanol was added 0.2 g. sodium hydroxide and the solution was refluxed under nitrogen for twelve hours. The solution was concentrated in vacuo to about 25 ml. and diluted with 200 ml. of water. After refrigeration, the precipitate was filtered off, washed with water and dried for three hours under vacuum at 110° C. The material weighed 0.26 g. and had a M.P. of 285–290°, $[a]_D^{25}$ of +53° in chloroform. Thus no conversion took place.

The above described procedure was repeated with the other position isomer of 17,17a-phenyl-E-homoyohimbone, M.P. 246–253° C., $[\alpha]_D^{25}$ of −83° in chloroform obtained as described in Example 6. The product obtained had an $[\alpha]_D^{25}$ of −83° in chloroform, indicating that no conversion took place.

The fact that no change in optical rotation was observed in subjecting the two isomers of 17,17a-phenyl-E-homoyhimbone to base catalysed epimerization as described above is further evidence of the fact that position isomers are obtained by the reaction of yohimbone with phenyldiazomethane as described in Example 2. If the two materials obtained in the separation as described in Example 6 were merely optical isomers (epimers), the base catalysed epimerization would convert one to the other or both to some equilibrium mixture. Since no change in optical rotation was observed, it is established that each isomer is a position isomer and represents the stable configuration in each case.

*Example 9*

A quantity of 0.3 gram of 17,17a-phenyl-E-homoyohimbone, M.P. 288–294° C., $[\alpha]_D^{25}$ of +54 in chloroform, prepared as described in Example 6, was dissolved in chloroform. To the solution was added 2 ml. methyl iodide and the mixture was refluxed for 30 minutes. After cooling, the crystals were washed with chloroform and ethanol and recrystallized from absolute ethanol, yielding crystals of the methiodide derivative, having a melting point of 236–242° C., $[\alpha]_D^{25}$ of +46° in pyridine.

*Example 10*

The procedure of Example 9 was repeated using the other isomer of 17,17a-phenyl-E-homoyohimbone, M.P. 246–253° C., $[\alpha]_D^{25}$ of −83° in chloroform, obtained as described in Example 6. The resulting methiodide derivative has a melting point of 262–264° C. and an $[\alpha]_D^{25}$ of −46° in pyridine.

*Example 11*

A quantity of 0.2 gram 17,17a-phenyl-E-homoyohimbone, M.P. 288–294° C., $[\alpha]_D^{25}$ of +54° in chloroform, prepared as described in Example 6 was dissolved in 16 ml. chloroform. 2 ml. 5 N hydrochloric acid in ethanol was added drop-wise, followed by 150 ml. absolute ethanol. The mixture was cooled, the crystals separated by filtration and washed with 40 ml. dry ether and 5 ml. cold ethanol. The crystals were recrystallized from 95 percent ethanol. The resulting hydrochloride derivative has a melting point of 323–331° C. and an $[\alpha]_D^{25}$ of +45° in pyridine.

*Example 12*

The procedure of Example 11 was repeated using the other isomer of 17,17a-phenyl-E-homoyohimbone, M.P. 246–253° C., $[\alpha]_D^{25}$ of −83° in chloroform, obtained described in Example 6. The resulting hydrochloride has a melting point of 324–326° C., $[\alpha]_D^{25}$ of −66° in pyridine.

The foregoing Examples 9 through 12 illustrate the preparation of the quaternary ammonium methiodide salts and the acid addition hydrochloride salts of the 2 position isomers of 17,17a-phenyl-E-homoyohimbone. It is to be understood that other non-toxic quaternary ammonium and acid addition salts may be prepared by procedures similar to those described in Examples 9 through 12.

The following example illustrates the Wolf-Kishner reduction of 17,17a-phenyl-E-homoyohimbone to produce the corresponding phenyl substituted E-homoyohimbane.

*Example 13*

A quantity of 1.0 gram of 17,17a-phenyl-E-homoyohimbone having a melting point of 288–294° C., $[\alpha]_D^{25}$ of +54° in chloroform, prepared as described in Example 6, was added to a mixture of 0.3 gram NaOH, 10 ml. hydrazine and 80 ml. diethyleneglycol. The mixture was heated until the temperature reached 198° C. The solution was then refluxed for 11 hours, cooled, and diluted with 500 ml. water. The precipitate was filtered off, washed with water, and then taken up in 200 ml. ether. The ethereal solution after being treated with charcoal was evaporated to dryness. Trituration of the residue with 20 ml. methanol gave material which on recrystallization from methanol had a melting point of 103–109° C., $[\alpha]_D^{25}$ of −14° in chloroform. Infrared analysis of the product shows complete absence of the carbonyl group.

The following Examples 14 through 17 show the reduction of 17,17a-phenyl-E-homoyohimbone to the corresponding 17,17a-phenyl-E-homoyohimbol.

Example 14

A quantity of 1.5 grams of the position isomer of 17,17a-phenyl-E-homoyohimbone having a M.P. 288–294° C. and an $[\alpha]_D^{25}$ of +54° in chloroform, obtained in Example 6, was dissolved in 80 ml. tetrahydrofuran and 5 grams of lithium tri-tert-butoxy aluminum hydride was added portion-wise. The mixture was allowed to stand overnight. Infrared analysis showed complete absence of the carbonyl group and the appearance of an —OH band at 3540 reciprocal centimeters. The solvent was removed by evaporation in vacuo. The residue was mixed with 20 ml. 20 percent NaOH and the mixture extracted with chloroform. After evaporation of chloroform from the extract, a residue of 0.95 gram was obtained. Recrystallization from ethanol yielded a product, 17,17a-phenyl-E-homoyohimbol, M.P. 232–235° C., $[\alpha]_D^{25}$ of −43° in chloroform.

Example 15

A solution of 12.6 grams of 17,17a-phenyl-E-homoyohimbone, M.P. 246–253° C., $[\alpha]_D^{25}$ of −83° in chloroform, prepared as described in Example 6, in 200 ml. tetrahydrofuran was added drop-wise to a saturated solution of lithium aluminum hydride in tetrahydrofuran. The mixture was refluxed for 5 hours, allowed to stand overnight and refluxed for 2 hours. After cooling in ice, 80 ml. ethyl acetate was added (to consume excess lithium aluminum hydride). 50 ml. water was added drop-wise followed by 200 ml. of 20 percent NaOH and the mixture concentrated in vacuo to remove tetrahydrofuran. The concentrate was diluted with an equal volume of water and extracted with three 200 ml. portions of chloroform. The extracts were combined, filtered and evaporated to dryness in vacuo. The residue was triturated with 20 ml. cold methanol, filtered and the crystals washed with ether and dried. 10.8 grams of 17,17a-phenyl-E-homoyohimbol melting point 225–228° C., $[\alpha]_D^{25}$ of +47° in chloroform is obtained.

Example 16

A quantity of 132 grams of 17,17a-phenyl-E-homoyohimbone having a melting point of 246–253° C., $[\alpha]_D^{25}$ of −83° in chloroform, prepared as described in Example 6, was suspended in 5.8 liters methanol. To the suspension was added portion-wise over a period of 1 hour a quantity of 60 grams of potassium borohydride. The suspension was stirred throughout the addition, the mixture was refluxed for 7 hours, and another portion of 30 grams of potassium borohydride was added. The resulting mixture was stirred for 1 week at room temperature with intermittent periods of refluxing, adding up to a total of 50 hours. The mixture was filtered and evaporated under vacuum to obtain a yellow oil which was then taken up in 350 ml. glacial acetic acid. This mixture was diluted to 1400 ml. with water, and precipitated by the addition of concentrated ammonium hydroxide solution. The precipitate was dried for 14 hours under vacuum at a temperature of 80° C. The product 17,17a-phenyl-E-homoyohimbol has a melting point of 202–212° C., $[\alpha]_D^{25}$ of −6° in chloroform. Infrared analysis of the product shows substantial absence of carbonyl group.

Example 17

A quantity of 1.5 grams of 17,17a-phenyl-E-homoyohimbone, M.P. 246–253° C., $[\alpha]_D^{25}$ of −83° in chloroform, prepared as described in Example 6, was dissolved in 100 ml. tetrahydrofuran and 4.5 grams lithium tri-tert-butoxy aluminum hydride was added, with stirring, over a period of 50 minutes. Stirring was continued overnight, with infrared analysis showing complete reduction of the ketone function. The solution was evaporated to dryness and the residue treated with 30 ml. 20 percent NaOH and 15 ml. 40 percent KOH. Chloroform was added followed by dilution to 250 ml. with water. The solution was filtered and the filtrate extracted with chloroform. The extract was dried over anhydrous MgSO$_4$, and evaporated to dryness. The solids were recrystallized from ethanol to yield 0.6 gram of 17,17a-phenyl-E-homoyohimbol, M.P. 226–230° C., $[\alpha]_D^{25}$ of +29° in chloroform. Evaporation of the mother liquor to dryness and trituration of the solids with acetonitrile yielded 0.45 gram additional product, M.P. 218–222° C., $[\alpha]_D^{25}$ of −5° in chloroform.

The products prepared as shown in Examples 15, 16 and 17 by the reduction of 17,17a-phenyl-E-homoyohimbone, melting point 246–253° C., $[\alpha]_D^{25}$ of −83° in chloroform, have similar melting points but different optical rotations indicating that different optical isomers predominate depending upon the particular reducing agent used in the reduction. A test of the tranquilizing action of the products of Examples 15, 16 and 17 in Rhesus monkeys indicates that the products of Examples 16 and 17 show a higher activity than that of the product of Example 15. This indicates the desirability of carrying out the reduction of substituted E-homoyohimbones to the corresponding E-homoyohimbols with the preferred reducing agents, namely, potassium borohydride and lithium-tri-t-butoxy aluminum hydride.

Example 18

To a solution of 0.3 gram of the position isomer of 17,17a-phenyl-E-homoyohimbol having a melting point of 226–230° C., $[\alpha]_D^{25}$ of +29° in chloroform, obtained in Example 17, in chloroform was added 2 ml. methyl iodide. The mixture was refluxed for 30 minutes and then cooled. The crystals were filtered, washed with chloroform and then with ethanol. The resulting methiodide derivative, after recrystallization from absolute ethanol, has a melting point of 236–242° C., $[\alpha]_D^{25}$ of +46° in chloroform.

Example 19

To a solution of 0.2 gram of 17,17a-phenyl-E-homoyohimbol having a melting point of 232–235° C., $[\alpha]_D^{25}$ of −43° in chloroform, prepared as described in Example 14, in 16 ml. chloroform was added 2 ml. 5 N HCl in ethanol in a drop-wise manner. 150 ml. absolute ethanol was added and the solution cooled, the crystals were recovered by filtration, washed with 40 ml. dry ether, and then with 5 ml. dry ethanol. The crystals were recrystallized from 95 percent ethanol to yield the hydrochloride derivative which has a melting point of 326–329° C., $[\alpha]_D^{25}$ of −41° in pyridine.

Example 20

The procedure of Example 19 was repeated to obtain the hydrochloride derivative of 17,17a-phenyl-E-homoyohimbol, melting point 226–230° C., $[\alpha]_D^{25}$ of +29° in chloroform, prepared as described in Example 17. The hydrochloride has a melting point of 306–309° C., $[\alpha]_D^{25}$ of +46° in pyridine.

The foregoing Examples 18 through 20 illustrate the preparation of quaternary ammonium methiodide salts and acid addition hydrochloride salts of 17,17a-phenyl-E-homoyohimbol. Other non-toxic salts may of course be prepared by procedures similar to those described in Examples 18 through 20.

The following Examples 21 to 27 illustrate the preparation of ester derivatives of 17,17a-phenyl-E-homoyohimbol.

Example 21

To 2.0 grams of the position isomer of 17,17a-phenyl-E-homoyohimbol having a M.P. of 232–235° C., $[\alpha]_D^{25}$ of −43° in chloroform, obtained in Example 14, in 20 ml. dry pyridine was added 10 ml. acetic anhydride. After standing overnight, the solution was evaporated in vacuo to remove solvent and excess acetic anhydride. The residue was mixed with 5 N acetic acid, decolorized over charcoal and treated with aqueous ammonia. The precipitate was triturated with acetonitrile to yield 1.20 grams of the acetate ester, M.P. 289–295° C., $[\alpha]_D^{25}$ of −59° in chloroform.

*Example 22*

The procedure of Example 21 was repeated to obtain the acetate ester of the position isomer of 17,17a-phenyl-E-homoyohimbol having a melting point of 226–230° C., $[\alpha]_D^{25}$ of +29° in chloroform, obtained in Example 17. The resulting acetate ester has a melting point of 215–217° C., $[\alpha]_D^{25}$ of +28° in chloroform.

*Example 23*

A quantity of 100 mg. of 17,17a-phenyl-E-homoyohimbol having a melting point of 232–235° C., $[\alpha]_D^{25}$ of −43° in chloroform, obtained as described in Example 14, was dissolved in 5 ml. anhydrous pyridine, and the resulting solution was added drop-wise to a solution of 90 mg. of 3,4,5-trimethoxybenzoylchloride in 8 ml. anhydrous pyridine. The solution was allowed to stand overnight at room temperature and then evaporated under vacuum. The residue was washed with water and recrystallized from ethanol to obtain the 3,4,5-trimethoxybenzoate ester which has a melting point of 246–248° C., $[\alpha]_D^{25}$ of −83° in chloroform.

*Example 24*

The procedure of Example 23 was repeated to obtain the 3,4,5-trimethoxybenzoate ester of 17,17a-phenyl-E-homoyohimbol having a melting point of 226–230° C., $[\alpha]_D^{25}$ of +29° in chloroform, obtained by the method of Example 17. The ester has a melting point of 212–213° C., $[\alpha]_D^{25}$ of +51° in chloroform.

*Example 25*

To 2.0 grams of the position isomer of 17,17a-phenyl-E-homoyohimbol having a melting point of 226–230° C., $[\alpha]_D^{25}$ of +29° in chloroform, obtained in Example 17, in 100 ml. anhydrous pyridine was added drop-wise a solution of 1.5 grams benzoyl chloride in 20 ml. dry pyridine. After standing for 24 hours, an additional 1.5 grams benzoyl chloride in 15 ml. dry pyridine was added and the mixture again allowed to react for 24 hours at 40° C. Tests indicate esterification to be complete. The pyridine was evaporated in vacuo and the residue stirred with 50 ml. chloroform. 5 grams ice and 20 ml. 5 percent HCl was added and the mixture shaken. The solids were separated by filtration, suspended in 50 ml. chloroform and treated with 25 ml. 5 percent NaOH. The chloroform layer was dried over anhydrous MgSO₄ and evaporated to dryness. Recrystallization from ethanol yields 1.25 grams of the desired benzoate ester. A second recrystallization yields crystals having a M.P. of 145–147° C., $[\alpha]_D^{25}$ of +59° in chloroform.

*Example 26*

A quantity of 0.7 gram of 17,17a-phenyl-E-homoyohimbol having a melting point of 232–235° C., $[\alpha]_D^{25}$ of −43° in chloroform, obtained as described in Example 14, was dissolved in 15 ml. dry pyridine and treated with 1 ml. methanesulfonyl chloride at 0° C. After 1 hour the solution was treated with 1 ml. ethanol and evaporated under vacuum to a semi-solid. This was triturated with 50 ml. water, the precipitate recovered by filtration, washed with water, and dissolved in chloroform. The chloroform solution was treated with charcoal, filtered and evaporated to dryness. Recrystallization from 95 percent ethanol yielded the purified methanesulfonate ester having a melting point of 323–328° C., $[\alpha]_D^{25}$ of −55° in chloroform.

*Example 27*

The procedure of Example 26 was repeated to obtain the methanesulfonate ester of the position isomer of 17,17a-phenyl-E-homoyohimbol having a melting point of 226–230° C., $[\alpha]_D^{25}$ of +29° in chloroform, obtained by the method of Example 17. The methanesulfonate ester has a melting point of 288–294° C., $[\alpha]_D^{25}$ of +51° in chloroform.

The foregoing Examples 21 to 27 illustrate the preparation of carboxylic acid and alkylsulfonic acid esters of 17,17a-phenyl-E-homoyohimbol. It is to be understood that other carboxylic acid esters, alkylsulfonic acid esters as well as alkyl substituted benzenesulfonic acid esters may be prepared by reacting 17,17a-phenyl-E-homoyohimbol with the appropriate free acid, acid anhydride or acyl halide in the same manner as described in Examples 21 to 27.

*Example 28*

The procedure of Example 19 was repeated to obtain the hydrochloride derivative of 17,17a-phenyl-E-homoyohimbol acetate, melting point 289–295° C., $[\alpha]_D^{25}$ of −59° in chloroform, prepared as described in Example 21. The hydrochloride has a melting point of 318–319° C., $[\alpha]_D^{25}$ of −45° in pyridine.

*Example 29*

The procedure of Example 19 was repeated to obtain the hydrochloride derivative of 17,17a-phenyl-E-homoyohimbol acetate, melting point 215–217° C., $[\alpha]_D^{25}$ of +28° in chloroform, prepared as described in Example 22. The hydrochloride has a melting point of 300–304° C., $[\alpha]_D^{25}$ of +25° in pyridine.

*Example 30*

The procedure of Example 19 was repeated to obtain the hydrochloride derivative of 17,17a-phenyl-E-homoyohimbol 3,4,5-trimethoxybenzoate, melting point of 226–230° C., $[\alpha]_D^{25}$ of +29° in chloroform, prepared as described in Example 24. The hydrochloride has a melting point of 273–277° C., $[\alpha]_D^{25}$ of +67° in pyridine.

*Example 31*

The procedure of Example 19 was repeated to obtain the hydrochloride derivative of 17,17α-phenyl-E-homoyohimbol benzoate, melting point of 145–147° C., $[\alpha]_D^{25}$ of +59° in chloroform, prepared as described in Example 25. The hydrochloride derivative has a melting point of 295–298° C., $[\alpha]_D^{25}$ of +68° in pyridine.

The foregoing Examples 28 to 31 illustrate the preparation of acid addition hydrochloride salts of esters of 17,17a-phenyl-E-homoyohimbol. It is to be understood that other non-toxic acid addition as well as quaternary ammonium salts may be prepared of esters of 17,17a-phenyl-E-homoyohimbol by procedures similar to those described in Examples 18 and 19.

The following Examples 32 to 38 illustrate the preparation of homoyohimbones and homoyohimbols substituted with chlorophenyl, methoxyphenyl, methylphenyl and 3,4-methylenedioxyphenyl.

*Example 32*

To a suspension of 6 grams of yohimbone in 120 ml. methanol was added 30.4 grams (0.2 mol) of p-chlorophenyldiazomethane in 200 ml. petroleum ether and the mixture stirred overnight at room temperature. Ionophoresis showed complete conversion of the yohimbone. The crystalline material was filtered off to give 7.1 grams, M.P. 195–225° C., $[\alpha]_D^{25}$ of −9° in chloroform, a mixture of the two position isomers of 17,17a-(p-chlorophenyl)-E-homoyohimbone.

The mixture of the two position isomers was separated into the individual isomers by fractional crystallization from chloroform by a procedure similar to that described in Example 4. The position isomer showing a positive rotation has a melting point of 287–298° C., $[\alpha]_D^{25}$ of +58° in chloroform. The other position isomer has a melting point of 252–257° C., $[\alpha]_D^{25}$ of −88° in chloroform.

Example 33

To a suspension of 4.5 grams of the position isomer of 17,17a-(p-chlorophenyl)-E-homoyohimbone having a melting point of 287–298° C., $[\alpha]_D^{25}$ of +58° in chloroform, prepared as described in Example 32, in 180 ml. of methanol was added portion-wise 2.5 grams of potassium borohydride with constant stirring of the suspension. After 6 hours infrared analysis showed complete reduction. The solution was concentrated to about 15 ml., diluted with 200 ml. water, and the residue filtered off and washed with 400 ml. of 1 percent ammonium hydroxide. The product was recrystallized from methanol followed by a recrystallization from acetone to give 17, 17a-(p-chlorophenyl)-E-homoyohimbol, melting point 266–275° C., $[\alpha]_D^{25}$ of −38° in chloroform.

Example 34

To a suspension of 26 grams yohimbone in 250 ml. methanol was added 90 grams of p-methoxyphenyldiazomethane. The mixture was stirred in the refrigerator for 60 hours. At the end of this time ionophoresis showed complete conversion. The crystals were filtered off, weight 10 grams, melting point 218–222° C., $[\alpha]_D^{25}$ of −35° in chloroform. The filtrate on concentration to about 60 ml. in vacuo deposited some azine which was filtered off and discarded. Addition of 500 ml. ether to the filtrate precipitated additional material which on recrystallization from acetone gave 7 grams, melting point 208–216° C., $[\alpha]_D^{25}$ of −49° in chloroform. The mixture of the two position isomers of 17,17a-(p-methoxyphenyl)-E-homoyohimbone was separated by fractional crystallization from chloroform by a procedure similar to that described in Example 4. The position isomer showing a positive rotation after recrystallization from acetone has a melting point of 228–233° C., $[\alpha]_D^{25}$ of +54° in chloroform. The other position isomer has a melting point of 233–235° C., $[\alpha]_D^{25}$ of −88° in chloroform.

Example 35

To a solution in 110 ml. dry tetrahydrofuran of 5 grams 17,17a-(p-methoxyphenyl)-E-homoyohimbone having melting point of 233–235° C., $[\alpha]_D^{25}$ of −88° in chloroform, prepared as described in Example 34, was added portion-wise 10 grams of lithium tri-t-butoxy aluminum hydride. After five hours of stirring a sample was withdrawn and determined by infrared analysis to be completely reduced. The solution was evaporated to a residue in vacuo which was partitioned between chloroform and 20 percent sodium hydroxide solution. Evaporation of the chloroform solution in vacuo gave a residue which on trituration with ethanol gave 3.7 grams white crystals, melting point 190–192° C., $[\alpha]_D^{25}$ of +28° in chloroform, 17,17a-(p-methoxyphenyl)-E-homoyohimbol.

Example 36

To a suspension of 25 grams of yohimbone in 180 ml. of methanol was added 19.8 grams of p-methylphenyldiazomethane in 200 ml. petroleum ether and the mixture was stirred for five days at room temperature. Ionophoresis at the end of this time showed complete conversion of the yohimbone. The crystalline material was filtered off to give 6.5 grams, $[\alpha]_D^{25}$ of +25° in chloroform. Two additional crops were obtained by concentration of the filtrate 7 g. $[\alpha]_D^{25}$ of 0°, 5 g. $[\alpha]_D^{25}$ of −32° in chloroform. Fractional recrystallizations of the negatively rotating materials gave material with rotation of −75° in chloroform. Further recrystallization from chloroform-acetone mixture followed by recrystallization from acetone gave the pure position of 17,17a-(p-methylphenyl)-E-homoyohimbone, melting point of 263–270° C., $[\alpha]_D^{25}$ of −88° in chloroform. The positively rotating material was refluxed with chloroform by the procedure described in Example 4, to yield crystals which after recrystallization several times from acetone had a melting point of 272–274° C., $[\alpha]_D^{25}$ of +51° in chloroform, the other position isomer of 17,17a-(p-methylphenyl)-E-homoyohimbone).

Example 37

To a suspension of 10 grams yohimbone in 130 ml. methanol was added 48.6 grams of 3,4-methylenedioxyphenyldiazomethane in 200 ml. petroleum ether and the mixture stirred for 72 hours in the refrigerator. Ionophoresis at the end of this time showed complete conversion of the yohimbone. The crystalline material was filtered off to give 4.6 grams, $[\alpha]_D^{25}$ of −55° in chloroform. Concentration of the filtrate gave additional materials 3.2 grams, $[\alpha]_D^{25}$ of −13°, 0.9 gram, $[\alpha]_D^{25}$ of +46° in chloroform.

Recrystallizations of the negatively rotating material from chloroform gave the pure position isomer of 17,17a-(3,4-methylenedioxyphenyl)-E-homoyohimbone, melting point 253–256° C., $[\alpha]_D^{25}$ of −92° in chloroform. Recrystallizations of the positively rotating isomer from acetone gave the other position isomer, melting point of 234–236° C., $[\alpha]_D^{25}$ of +54° in chloroform.

Example 38

To a solution in 80 ml. dry tetrahydrofuran of 3.1 grams of 17,17a-(3,4-methylenedioxyphenyl)-E-homoyohimbone having a melting point of 253–256° C., $[\alpha]_D^{25}$ of −92° in chloroform, prepared as described in Example 37, was added drop-wise over a period of 15 minutes at 0° C. a solution of 10 grams lithium tri-t-butoxy aluminum hydride in 130 ml. dry tetrahydrofuran. The solvent was removed in vacuo and the residue, after treatment with 20 percent sodium hydroxide solution, was exhaustively extracted with chloroform. Additional material was obtained by retreating the residue with 10 percent hydrochloric acid, followed by basification with ammonium hydroxide and chloroform extraction. The combined chloroform extracts after drying over sodium sulfate and evaporated in vacuo yielded 3.2 grams of product, melting point 215–238° C., $[\alpha]_D^{25}$ of +28° in chloroform. Recrystallization from methanol gave the pure position isomer of 17,17a-(3,4-methylenedioxyphenyl)-E-homoyohimbol, melting point of 235–238° C., $[\alpha]_D^{25}$ of +31° in chloroform.

It is to be understood that the procedures of Examples 32 to 38 may be utilized to obtain other substituted phenyl derivatives of homoyohimbone and homoyohimbol. In addition, the homoyohimbone and homoyohimbol derivatives of Examples 32 to 38 as well as other analogous compounds can be converted to non-toxic acid addition and quaternary ammonium salts by the procedures described in Examples 18 and 19. The substituted homoyohimbols of Examples 33, 35, and 38 as well as other analogous homoyohimbols can be esterified to form carboxylic acid, alkyl sulfonic acid, and alkyl substituted benzenesulfonic acid esters by the procedures described in Examples 21 to 27 and those esters may in turn be converted to the corresponding non-toxic acid addition and quaternary ammonium salts.

The following Examples 39 to 50 illustrate the preparation of E-homoyohimbones and E-homoyohimbols, substituted with hydrogen and lower alkyl groups, and esters and hydrochloride derivatives thereof.

Example 39

22 grams of yohimbone was added to a solution of 10.5 grams (0.25 mol) of diazomethane in 1200 ml. ether and 400 ml. methanol. The mixture was stirred for two days. At the end of this time the solution was evaporated to dryness and the residue treated with a small amount of ethanol, cooled, and the precipitate filtered. 12.1 grams of a solid is obtained, melting point 167–180° C., $[\alpha]_D^{25}$ of −38° in chloroform, a mixture of 17-E-homoyohimbone and 17a-E-homoyohimbone.

Example 40

A quantity of 3.5 grams of the mixed position isomers of 17-E-homoyohimbone and 17a-E-homoyohimbone obtained in Example 39 was added to 180 ml. methanol and 1 gram potassium borohydride was added with stirring over a period of 2 hours. The solution was allowed to stand overnight and the methanol was evaporated in vacuo. The residue was treated with water, filtered and the precipitate washed with 300 ml. water. The solids were dissolved in acetic acid, precipitated by the addition of ammonia, filtered, washed with ammoniacal water and dried in vacuo. A yield of 2.4 grams of the mixed position isomers, 17-E-homoyohimbol and 17a-E-homoyohimbol, is obtained, melting point 244–248° C., $[\alpha]_D^{25}$ of −28° in 5 N acetic acid.

Example 41

A quantity of 100 mg. of the mixed position isomers, 17-E-homoyohimbol and 17a-E-homoyohimbol, obtained in Example 40, in 5 ml. anhydrous pyridine was added drop-wise to a solution of 90 mg. of 3,4,5-trimethoxybenzoyl chloride in 8 ml. anhydrous pyridine. After standing overnight at room temperature, the solution was evaporated in vacuo, the residue washed with water and recrystallized from ethanol. A yield of 50 mg. of the 3,4,5-trimethoxy benzoate ester of the mixed position isomers is obtained, melting point 246–252° C., $[\alpha]_D^{25}$ of −2° in chloroform.

Example 42

A quantity of 5 grams yohimbone and 150 ml. methanol were added to a solution of approximately 2.8 grams (0.05 mol) diazoethane in 150 ml. methylene chloride. After 10 minutes agitation the yohimbone dissolved completely with vigorous evolution of nitrogen. After standing overnight the solution was evaporated to dryness and the residue treated with an additional amount of diazoethane to insure complete reaction. After again standing overnight the solution was evaporated in vacuo to a small volume, and the product crystallized to give 3.86 grams of material, melting point 212–218° C. $[\alpha]_D^{25}$ of −36° in chloroform, a mixture of 17-methyl-17a-E-homoyohimbone and 17a-methyl-17-E-homoyohimbone.

Example 43

The procedure of Example 19 was repeated to obtain the hydrochloride derivative of the mixed position isomers of 17-methyl-17a-E-homoyohimbone and 17a-methyl-17-E-homoyohimbone prepared as described in Example 42. The hydrochloride has a melting point of 305-307° C., $[\alpha]_D^{25}$ of −36° in pyridine.

Example 44

A quantity of 3.8 grams of the mixed position isomers, 17-methyl-17a-E-homoyohimbone and 17a-methyl-17-E-homoyohimbone obtained in Example 42 was added to 180 ml. methanol and 2 grams of potassium borohydride was added portion-wise with stirring. The solution was allowed to stand overnight. The product was recovered in the manner shown in Example 40. A yield of 3.35 grams of the mixed position isomers, 17-methyl-17a-E-homoyohimbol and 17a-methyl-17-E-homoyohimbol, is obtained, melting point 125–130° C. (amorphous), $[\alpha]_D^{25}$ of −67° in chloroform. Infrared analysis showed complete absence of keto function. A Kuhn-Roth determination showed the presence of one

group.

Example 45

The procedure of Example 19 was repeated to obtain the hydrochloride derivative of the mixed position isomers, 17-methyl-17a-E-homoyohimbol and 17a-methyl-17-E-homoyohimbol, prepared as described in Example 44. The hydrochloride has a melting point of 323–331° C., $[\alpha]_D^{25}$ of +45° in pyridine.

Example 46

To a suspension of 35 grams of yohimbone in 400 ml. methanol was added 900 ml. 0.35 N diazopropane in ether and the mixture was stirred overnight. Two successive 250 ml. portions of 0.35 N diazopropane in ether were added, the mixture being stirred for 24 hours after the addition of each portion. Ionophoresis showed complete conversion. After filtering off small amounts of polymerization products, the solution was concentrated to about 60 ml., and the crystals were separated by filtration. Weight of the first crop of product was 13.0 grams, melting point 228–242° C., $[\alpha]_D^{25}$ of −43° in chloroform. A second crop was obtained after evaporation of the filtrate to 25 ml., weight 11.0 grams, melting point 170–175° C., $[\alpha]_D^{25}$ of −28° in chloroform. The mother liquor was evaporated and the residue treated with 25 ml. acetonitrile yielding an additional 5.0 grams of product, melting point 172–178° C., $[\alpha]_D^{25}$ of −41° in chloroform. The dark mother liquor was chromatographed over a magnesium silicate absorbent using U.S.P. ether as solvent to give an additional 3.44 grams of product from acetonitrile, $[\alpha]_D^{25}$ of −25° in chloroform. Total yield of product was 80 percent of theoretical: 32.40 grams of a mixture of 17-ethyl-17a-E-homoyohimbone and 17a-ethyl-17-E-homoyohimbone.

A quantity of 2 grams of this mixture of position isomers was triturated with 10 ml. cold chloroform and filtered. The insoluble material after recrystallization from ethanol yielded white crystals of the negatively rotating position isomer, melting point of 258–263° C., $[\alpha]_D^{25}$ of −90° in chloroform.

Example 47

The procedure of Example 19 was repeated to obtain the hydrochloride derivatives of the mixed position isomers of 17,17a-ethyl-E-homoyohimbones prepared as described in Example 46. The hydrochloride has a melting point of 306–308° C., $[\alpha]_D^{25}$ of −47° in pyridine.

Example 48

To a suspension of the mixed position isomers 17,17a-ethyl-E-homoyohimbone prepared as described in Example 46 in 110 ml. methanol was added portion-wise 3.5 grams of potassium borohydride. The solution was allowed to stand overnight and the product recovered in the manner described in Example 40. A yield of 5.5 grams of the mixed position isomers of 17,17a-ethyl-E-homoyohimbol was obtained. After recrystallization from absolute ether, crystals were obtained with a melting point of 199–201° C., $[\alpha]_D^{25}$ of −65° in pyridine.

Example 49

To a suspension of 10 grams yohimbone in 200 ml. methanol was added 1000 ml. of ethereal 0.1 N diazo-iso-butane and the mixture stirred overnight in a refrigerator. Complete solution occurred and ionophoresis showed complete conversion of the yohimbone. The solution was filtered to remove small amounts of polymerization products and concentrated in vacuo to about 20 ml. of orange semi-solid material. Trituration with ether gave 2.5 grams fine, white crystals, $[\alpha]_D^{25}$ of −67° in chloroform. This on recrystallization from ethanol and then acetone had a melting point of 228–230° C., $[\alpha]_D^{25}$ of −88° in chloroform. This is the pure negatively rotating position isomer of 17,17a-isopropyl-E-homoyohimbone.

Concentration of the ethereal filtrate to dryness and trituration with ether gave material having much lower negative rotation, indicating the presence of the positively rotating isomer.

Example 50

To a suspension of 3.8 grams of the mixture of both position isomers of 17,17a-isopropyl-E-homoyohimbone obtained in Example 49 was added portion-wise with stirring 2 grams of potassium borohydride. The mixture was stirred for 5 hours and evaporated under vacuum. The residue was treated with 150 ml. water, filtered and washed with 500 ml. of 1 percent ammonium hydroxide. Recrystalilzation from acetone yielded crystals of the mixed position isomers of 17,17a-isopropyl-E-homoyohimbol, melting point 230–236° C., $[\alpha]_D^{25}$ of $-64°$ in chloroform.

It is to be understood that the procedures of Examples 39 to 50 may be utilized to obtain other lower alkyl substituted E-homoyohimbones and E-homoyohimbols. The E-homoyohimbols may be converted to ester derivatives by the procedure of Examples 21 to 27 and the E-homoyohimbones, E-homoyohimbols and esters may be reacted to form the corresponding acid addition and quaternary ammonium salts by the procedures of Examples 18 and 19.

The foregoing examples are merely illustrative of the various yohimbone derivatives which may be prepared in accordance with this invention and that many variations may be made therein without departing from the spirit of my invention. It is to be understood that E-homoyohimbanes, E-homoyohimbones, E-homoyohimbols and E-homoyohimbol esters may be prepared in accordance with this invention monosubstituted with radicals other than those represented by the foregoing examples including for example, phenyl substituted lower alkyl and cycloalkyl and lower alkyl substituted cycloalkyl with 5 to 6 carbon atoms in the cycloalkyl ring.

Having described my invention, what I desire to secure by Letters Patent is:

1. A compound selected from the group consisting of those of the formula:

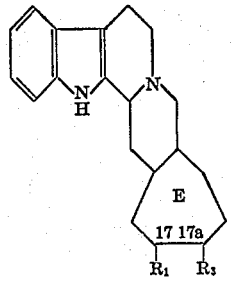

and

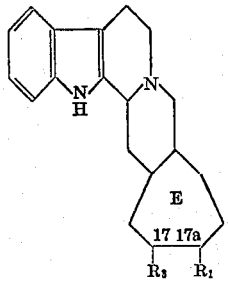

wherein $R_1$ is a member selected from the group consisting of hydrogen, keto, hydroxyl and $-OR_2$, $R_2$ being selected from the group consisting of lower alkyl sulfonyl, lower alkyl substituted benzene sulfonyl, the acyl radical of a lower alkyl carboxylic acid, benzoyl, and benzoyl substituted with 1 to 3 members selected from the group consisting of lower alkyl, halo, and lower alkoxy; and $R_3$ is a member selected from the group consisting of hydrogen, lower alkyl, phenyl substituted lower alkyl, cycloalkyl and lower alkyl substituted cycloalkyl containing 5 to 6 carbon atoms in the cycloalkyl ring, phenyl, and substituted phenyl selected from the group consisting of 3,4-methylenedioxyphenyl and phenyl substituted with 1 to 3 radicals selected from the group consisting of lower alkyl, halo, and lower alkoxy, and pharmaceutically acceptable non-toxic acid addition and quaternary ammonium salts thereof.

2. 17-phenyl-17a-E-homoyohimbone.
3. 17a-phenyl-17-E-homoyohimbone.
4. 17-phenyl-17a-E-homoyohimbol.
5. 17a-phenyl-17-E-homoyohimbol.

6. A method of producing a substituted E-homoyohimbone which comprises reacting yohimbone with a substituted diazomethane having the formula $R_3-CHN_2$, wherein $R_3$ is a member selected from the group consisting of hydrogen, lower alkyl, phenyl substituted lower alkyl, cycloalkyl and lower alkyl substituted cycloalkyl containing 5 to 6 carbon atoms in the cycloalkyl ring, phenyl, and substituted phenyl selected from the group consisting of 3,4-methylenedioxyphenyl and phenyl substiuted with 1 to 3 radicals selected from the group consisting of lower alkyl, halo, and lower alkoxy.

7. A method of producing a substituted E-homoyohimbol which comprises treating a substituted E-homoyohimbone selected from the group consisting of:

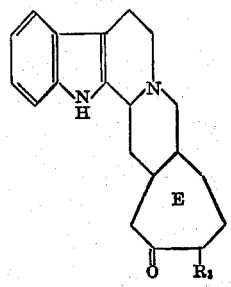

and

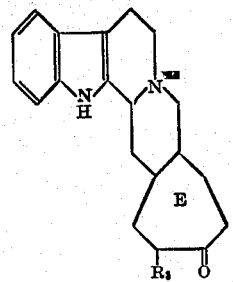

wherein $R_3$ is a member selected from the group consisting of hydrogen, lower alkyl, phenyl substituted lower alkyl, cycloalkyl and lower alkyl substituted cycloalkyl containing 5 to 6 carbon atoms in the cycloalkyl ring, phenyl, and substituted phenyl selected from the group consisting of 3,4-methylenedioxyphenyl and phenyl substituted with 1 to 3 radicals selected from the group consisting of lower alkyl, halo, and lower alkoxy with a reducing agent selected from the group consisting of an alkali metal borohydride and lithium tri-t-butoxy aluminum hydride.

References Cited in the file of this patent

Wiktop: Ann., vol. 554, page 83 (1943).